(12) United States Patent
Yin et al.

(10) Patent No.: US 10,789,475 B2
(45) Date of Patent: Sep. 29, 2020

(54) OFFLINE-SERVICE MULTI-USER INTERACTION BASED ON AUGMENTED REALITY

(71) Applicant: Alibaba Group Holding Limited, George Town (KY)

(72) Inventors: Huanmi Yin, Hangzhou (CN); Xiaodong Zeng, Hangzhou (CN); Feng Lin, Hangzhou (CN); Jun Wu, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/422,798

(22) Filed: May 24, 2019

(65) Prior Publication Data

US 2019/0278997 A1  Sep. 12, 2019

Related U.S. Application Data

(63) Continuation of application No. 15/792,594, filed on Oct. 24, 2017, now Pat. No. 10,303,946.

(30) Foreign Application Priority Data

Oct. 13, 2016  (CN) .......................... 2016 1 0896495

(51) Int. Cl.
*G06T 19/00* (2011.01)
*G06K 9/00* (2006.01)
(Continued)

(52) U.S. Cl.
CPC ......... *G06K 9/00671* (2013.01); *G06F 3/011* (2013.01); *G06K 7/1404* (2013.01);
(Continued)

(58) Field of Classification Search
None
See application file for complete search history.

(56) References Cited

U.S. PATENT DOCUMENTS

| 9,432,421 | B1 | 8/2016 | Mott et al. |
| 10,303,946 | B2 | 5/2019 | Yin et al. |

(Continued)

FOREIGN PATENT DOCUMENTS

| AU | 2017342562 | 4/2018 |
| CN | 102843349 | 12/2012 |

(Continued)

OTHER PUBLICATIONS

Crosby et al., "BlockChain Technology: Beyond Bitcoin," Sutardja Center for Entrepreneurship & Technology Technica Report, Oct. 16, 2015, 35 pages.

(Continued)

*Primary Examiner* — David H Chu
(74) *Attorney, Agent, or Firm* — Fish & Richardson P.C.

(57) ABSTRACT

A method for offline-service multi-user interaction based on augmented reality (AR) includes scanning, by an AR client terminal of a user, an offline service label at an offline service site. Information of the offline service label is transmitted to a server terminal. Based on the information of the offline service label, the server terminal establishes a service group including the user and a second user that scanned the offline service label. In response to transmitting the information of the offline service label, service data is received from the server terminal. The service data includes information related to the user and information related to the second user. Based on the service data, a service interactive interface is outputted. The service interactive interface displays the
(Continued)

information related to the user and the information related to the second user at a position corresponding to the offline service label in an AR scene.

20 Claims, 7 Drawing Sheets

(51) Int. Cl.
    *G06F 3/01*          (2006.01)
    *G06K 7/14*          (2006.01)
    *G06Q 30/02*        (2012.01)
    *G06Q 30/06*        (2012.01)
    *G06Q 50/12*        (2012.01)

(52) U.S. Cl.
    CPC ..... *G06Q 30/0238* (2013.01); *G06Q 30/0261* (2013.01); *G06Q 30/0641* (2013.01); *G06Q 50/12* (2013.01); *G06T 19/006* (2013.01)

(56) References Cited

U.S. PATENT DOCUMENTS

| | | | |
|---|---|---|---|
| 2008/0266323 | A1 | 10/2008 | Biocca et al. |
| 2012/0069131 | A1* | 3/2012 | Abelow ............... G06Q 10/067 348/14.01 |
| 2013/0218766 | A1 | 8/2013 | Mueller |
| 2013/0249947 | A1 | 9/2013 | Reitan |
| 2015/0149307 | A1 | 5/2015 | Thukral |
| 2016/0131487 | A1 | 5/2016 | Ku et al. |
| 2016/0162964 | A1* | 6/2016 | Calman ................ G06Q 30/02 705/26.41 |
| 2017/0154471 | A1 | 6/2017 | Woo et al. |
| 2018/0121727 | A1 | 5/2018 | Yin et al. |

FOREIGN PATENT DOCUMENTS

| | | |
|---|---|---|
| CN | 104835005 | 8/2015 |
| CN | 104978697 | 10/2015 |
| CN | 205040940 | 2/2016 |
| CN | 106022873 | 10/2016 |
| CN | 106981000 | 7/2017 |
| EP | 2722811 | 4/2014 |
| EP | 3526755 | 8/2019 |
| JP | 2005326949 | 11/2005 |
| JP | 2012048648 | 3/2012 |
| JP | 2012053850 | 3/2012 |
| JP | 2012178069 | 9/2012 |
| JP | 2013031080 | 2/2013 |
| JP | 2016192746 | 11/2016 |
| JP | 2020504852 | 2/2020 |
| KR | 20120080410 | 7/2012 |
| KR | 20140133640 | 11/2014 |
| KR | 20150039233 | 4/2015 |
| KR | 20200027459 | 3/2020 |
| RU | 2559741 | 8/2015 |
| RU | 2596997 | 9/2016 |
| TW | 201329898 | 7/2013 |
| TW | M477649 | 5/2014 |
| TW | M482796 | 7/2014 |
| TW | M499617 | 4/2015 |
| WO | WO 2014017395 | 1/2014 |
| WO | WO 2018071921 | 4/2018 |

OTHER PUBLICATIONS

Nakamoto, "Bitcoin: A Peer-to-Peer Electronic Cash System," www.bitcoin.org, 2005, 9 pages.

European Extended Search Report in European Application No. 17860121.7, dated Jul. 18, 2019, 10 pages.

International Search Report and Written Opinion in International Application No. PCT/US2017/058847, dated Jan. 26, 2018, 13 pages.

International Preliminary Report on Patentability in International Application No. PCT/US2017/058847, dated Dec. 17, 2018, 8 pages.

\* cited by examiner

OFFLINE-SERVICE MULTI-USER INTERACTION BASED ON AUGMENTED REALITY

CROSS-REFERENCE TO RELATED APPLICATIONS

This application is a continuation of U.S. application Ser. No. 15/792,594, filed on Oct. 24, 2017, which claims priority to Chinese Patent Application No. 201610896495.X, filed on Oct. 13, 2016, the entire contents of which are hereby incorporated by reference.

BACKGROUND

Augmented reality (AR) technology augments an image of a real-world environment (reality) by superimposing supplemental information (such as, pictures, videos, three-dimensional (3D) models, and other sensory enhancements) onto the real-word environment. The AR technology overlays virtual objects onto the image of the real world, enhancing a user's perception of reality and providing a user with an immersive, interactive experience.

SUMMARY

The present disclosure describes offline-service multi-user interaction based on augmented reality (AR).

In an implementation, an AR client terminal of a user scans an offline service label at an offline service site. Information of the offline service label is transmitted to a server terminal. Based on the information of the offline service label, the server terminal establishes a service group including the user and a second user that scanned the offline service label. In response to transmitting the information of the offline service label, service data is received from the server terminal. The service data includes information related to the user and information related to the second user. Based on the service data, a service interactive interface is outputted. The service interactive interface displays the information related to the user and the information related to the second user at a position corresponding to the offline service label in an AR scene.

Implementations of the described subject matter, including the previously described implementation, can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented in particular implementations, so as to realize one or more of the following advantages. First, the described approach integrates online social services with offline services using AR technologies. For example, when a user is at an offline service site (such as, a restaurant or a physical store), the user's AR terminal can display an AR scene including information of the user's social contacts related to the offline service site (such as, reviews of the restaurant from the user's social contacts). Second, the described approach enables a multi-user interactive interface for users to communicate with each other using AR technologies, providing a new offline service experience for users. For example, users dining at the same restaurant table can use the multi-user interactive interface provided by individual AR terminals to jointly order food. Other advantages will be apparent to those of ordinary skill in the art.

The details of one or more implementations of the subject matter of this specification are set forth in the Detailed Description, the Claims, and the accompanying drawings. Other features, aspects, and advantages of the subject matter will become apparent from the Detailed Description, the Claims, and the accompanying drawings.

DESCRIPTION OF DRAWINGS

Like reference numbers and designations in the various drawings indicate like elements.

DETAILED DESCRIPTION

Figure 1:
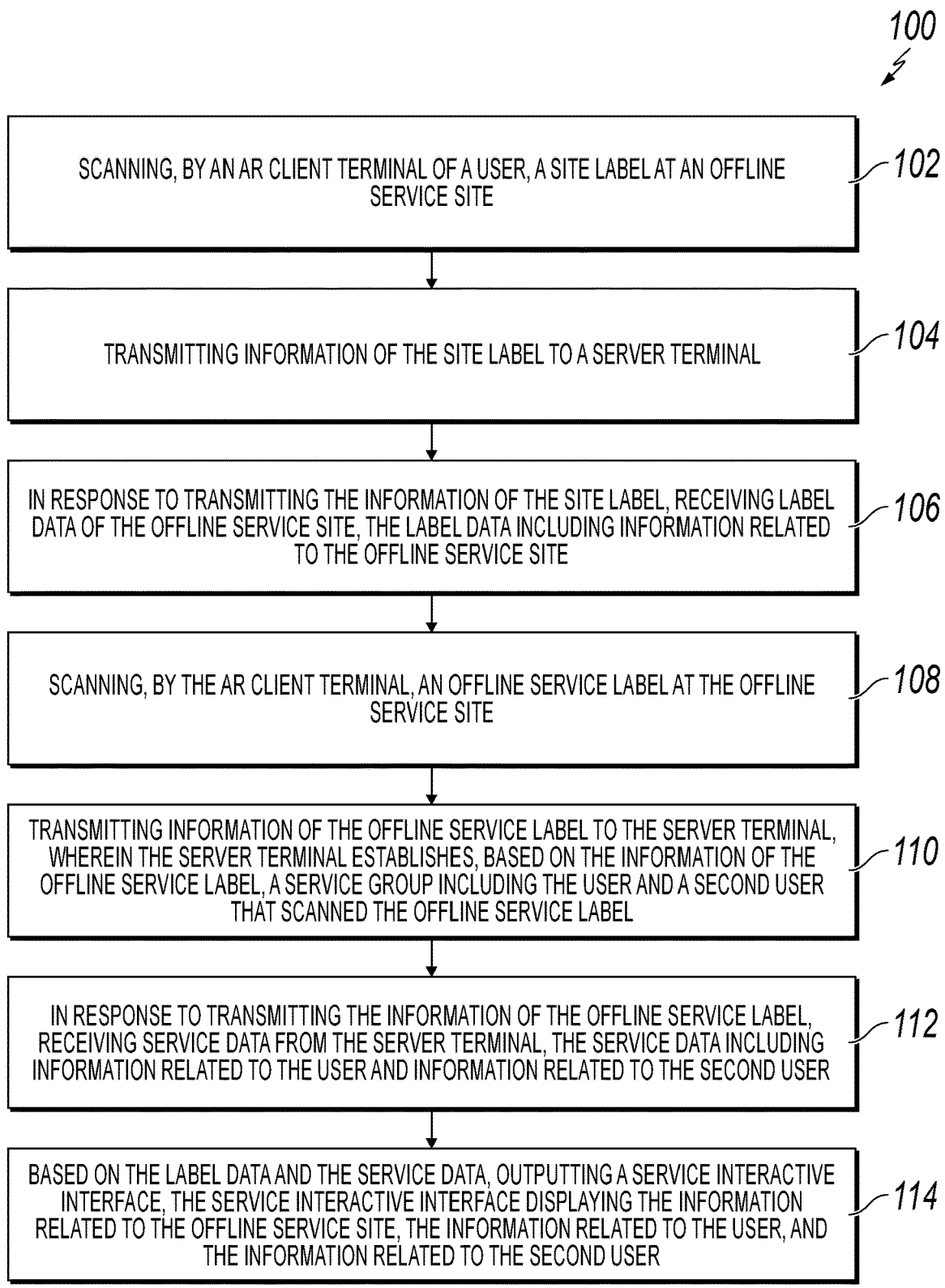
FIG. 1 is a flowchart illustrating an example of a computer-implemented method for offline-service multi-user interaction based on augmented reality (AR), according to an implementation of the present disclosure.

The following detailed description describes offline-service multi-user interaction based on augmented reality (AR), and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, details unnecessary to obtain an understanding of the described subject matter can be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

AR technology augments an image of a real-world environment (reality) by superimposing supplemental information (such as, pictures, videos, three-dimensional (3D) models, and other sensory enhancements) onto the real-word environment. The AR technology overlays virtual objects onto the image of the real world, enhancing a user's perception of reality and providing a user with an immersive, interactive experience.

At a high level, the described approach enables a user interaction mode by integrating online multi-user social services with offline services based on an AR technology. An offline service refers to a service that is not directly performed by a computer, for example, dining in a physical restaurant (also called an offline restaurant) or shopping in a physical store instead of an online store. For integrating online services and offline services, an offline service site (such as a physical store or restaurant) can present an offline service label (such as a quick response (QR) code) for triggering an offline-service multi-user interactive interface (also called service interface). Each user can have an AR terminal. After the multiple users scan the offline service label through individual AR terminals, each AR terminal can display the service interface in an AR scene (the scene the user sees through the AR terminal, which is the environmental scene overlaid with virtual objects). The multiple users can interact with each other using the service interface displayed in the AR scene. The described approach provides a new offline service interaction mode to users, achieving seamless integration of an online multi-user social mode with an offline service based on the AR technology.

For example, the described approach can be applied to offline food-ordering in a restaurant. The restaurant can present a food-ordering label (for example, a particular QR code or a restaurant identification) for triggering a food-ordering interface. After multiple users on a table scan the food-ordering label through individual AR terminals, each AR terminal can output an AR technology-based food-ordering interface, so that the multiple users can jointly order food using the food-ordering interface.

In some implementations, a user can wear an AR terminal (such as, AR glasses, headset, or helmet) and the AR terminal can include an AR client terminal. The AR client terminal can be software, hardware, or a combination of software and hardware developed based on AR technologies. The AR client terminal can perform image scanning of an environmental scene (for example, an image in view of the AR terminal) and transmit the scanned image to a server terminal in real time. In some cases, the AR terminal can be the user's mobile terminal (such as a smart phone or tablet-type computer), and the AR client terminal is installed in the mobile terminal.

The server terminal can be a server, a server cluster, or a cloud platform based on a server cluster. The server terminal can provide services to the AR client terminal. For example, the server terminal (or a back-end AR engine in the server terminal) can perform image recognition on the image scanned by the AR client terminal and recognize contents in the image. The server terminal can also manage virtual data related to an offline service. The virtual data can include information of virtual objects to be overlaid on an environmental scene image scanned by the AR client terminal. Based on the results of the image recognition, the server terminal can push related virtual data (for example, virtual data related to the contents in the image) to the AR client terminal.

After receiving the virtual data from the server terminal, the AR client terminal (or a front-end AR engine in the AR client terminal) can display virtual objects based on the virtual data and superimpose the virtual objects on the environmental scene image scanned by the AR client terminal. For example, the user can use the AR client terminal to scan a particular identification in an environmental scene (for example, a QR code on a restaurant front door). Upon completion of the scanning, the AR client terminal can upload information of the scanned image to the server terminal, and the server terminal can perform image recognition. After successfully recognizing the particular identification, the server terminal can push virtual data related to the particular identification to the AR client terminal. Upon receiving the virtual data of the particular identification from the server terminal, the AR client terminal can create an AR scene model and display the virtual data at a position corresponding to the particular identification in the AR scene model, therefore superimposing the environmental scene with the virtual data from the server terminal.

In some implementations, the AR client terminal can perform the image recognition instead of the server terminal. For example, upon completion of scanning the particular identification in the environmental scene, the AR client terminal can perform image recognition on the scanned image and identify the particular identification. The AR client terminal can send information of the identified particular identification to the server terminal so that the server terminal can push the virtual data related to the particular identification to the AR client terminal.

FIG. 1 is a flowchart illustrating an example of a computer-implemented method 100 for offline-service multi-user interaction based on AR, according to an implementation of the present disclosure. For clarity of presentation, the description that follows generally describes method 100 in the context of the other figures in this description. However, it will be understood that method 100 can be performed, for example, by any system, environment, software, and hardware, or a combination of systems, environments, software, and hardware, as appropriate. In some implementations, various steps of method 100 can be run in parallel, in combination, in loops, or in any order.

At 102, an AR client terminal of a user scans a site label at an offline service site. The offline service site can be a site providing an offline service, for example, a physical store or restaurant. The site label can be a logo, an image identification of the offline service site, or other labels consistent with this disclosure. For example, the site label can be a QR code on a restaurant front door.

In some implementations, the AR client terminal can include location-based-service (LBS) applications that provide positioning and recommendation functions. For example, the AR client terminal can determine a store location or recommend stores close to the user's current location. The user can search, through a positioning service provided by the AR client terminal, for an offline service site. In some cases, the user can select an offline service site from the offline service sites recommended by the AR client terminal based on LBS services. After the user arrives at the offline service site, the user can use the AR client terminal to scan the site label of the offline service site. From 102, method 100 proceeds to 104.

At 104, the AR client terminal transmits information of the scanned site label to a server terminal in real time. In some implementations, the AR client terminal also transmits identification information of the user to the server terminal. The user identification information can be used to uniquely identify the user. For example, the user identification information can be account information used by the user to log into the AR client terminal, the user's social account information of a social application (for example, a social application used by the AR client terminal), or the user's cell phone number.

In some implementations, the AR client terminal can establish a connection (such as a transmission control protocol (TCP) connection) with the server terminal, and use the established connection for sending the information of the scanned site label and the user identification information to the server terminal. From 104, method 100 proceeds to 106.

At 106, the AR client terminal receives virtual data related to the offline service site. For example, the server terminal can identify the user based on the received user identification information, and identify the offline service site based on the scanned site label. The server terminal can maintain a database storing a large number of site labels of offline service sites as well as virtual data related to the individual site labels. The server terminal (or a back-end AR engine in the server terminal) can perform image recognition to identify the site label in the scanned image and determine if the identified site label matches any site label in the database. If the identified site label matches a site label in the database, the server terminal can push the virtual data related to the matched site label to the AR client terminal. The pushed virtual data related to a site label can include various information. For example, the following three types of information can be pushed to the AR client terminal.

The first type of the pushed data can be label data related to the site label. The label data can be self-defined by the offline service site corresponding to the site label or submitted by a visitor of the offline service site. The label data can include description information of the site label, information of the offline service site (such as service features, prices, special offers, or customer ratings of the offline service site), and other information consistent with this disclosure. For example, the label data of a restaurant can include menu, food flavors, prices, customer ratings, special offers, or discount coupons of the restaurant.

In some implementations, after the user's AR client terminal scans the site label, the AR client terminal can recognize and display the site label in an AR scene. After receiving the label data of the site label from the server terminal, the AR client terminal can visually render the received label data, and display the label data at a position corresponding to the site label in the AR scene. For example, assume that the offline service site is an offline restaurant, and that the site label is a logo of the restaurant present at the restaurant's front door. When the user enters the restaurant, the user's AR terminal scans the logo on the front door, sends the scanned logo to the server terminal, and receives the label data. After the user enters the restaurant, although the physical logo is not in the view of the AR terminal anymore, the AR terminal displays a virtual logo in the AR scene and displays the label data near or on top of the virtual logo.

The second type of the pushed data can include information of the user's contacts. For example, information of a contact associated with the user can be information associated with a friend having a social relationship with the user in a social application. A friend having a social relationship with the user can be a friend having a direct or indirect social relationship with the user. A friend having an indirect social relationship with the user can be a friend having a social relationship with a friend of the user. For example, if user A is a friend of user B and user C is a friend of user B, then user C is a friend having an indirect social relationship with user A. After identifying the site label from the image information uploaded by the AR client terminal and based on the received user identification information, the server terminal can search database(s) to find information of contacts associated with the user, and push the found information to the AR client terminal.

For example, the received user identification information is the user's account information of a social application. Based on the user's social account information, the server terminal searches a social database (for example, a database of the social application) to find the user's direct and indirect friends. After identifying the offline service site based on the scanned site label, the server terminal searches a visitor database of the offline service site to determine, for example, the user's direct and indirect friends who have visited this offline service site and customer reviews from these friends. The server terminal then pushes the friend information to the AR client terminal. The AR client terminal visually renders the received friend information and displays the friend information at a position corresponding to the site label in the AR scene. For example, information of the user's contacts can be displayed at a position of the restaurant logo in the AR scene.

The third type of the pushed data can include information of an object predetermined or preselected for the user by another user when the other user performs offline service interaction in the offline service site. As will be discussed in step 114, for integrating a multi-user online social mode with an offline service interaction, when a user performs the offline service interaction in an offline service site through the user's AR client terminal, the user can predetermine an object (for example, a gift certificate) for another user (for example, the user's friend) based on the user's social relationship. The AR client terminal can upload information of the object predetermined by the user for a designated contact and identification information of the designated contact to the server terminal for storage.

After receiving the user's identification information, the server terminal can determine whether the server terminal stores any object predetermined by another user for this user. If an object is stored for the user, the server terminal can push information of the object to the user's AR client terminal. After receiving the object information from the server terminal, the AR client terminal can visually render the object and display the object at a position corresponding to the site label in the AR scene.

For example, user A bought a gift certificate for a designated contact, user B, through user A's AR client terminal when user A was dining in a restaurant. A next time when user B arrives at the restaurant and scans the restaurant logo (site label of the restaurant) through user B's AR client terminal, user B's AR client terminal can display the gift certificate bought by user A at a position corresponding to the restaurant logo in the AR scene.

In sum, when a user arrives at an offline service site, by scanning the site label of the offline service site using the user's AR terminal, the AR terminal can display an AR scene to the user in real time, where the AR scene includes, for example, an image of the site label, information of the user's contacts who have visited this offline service site, and objects predetermined for the user by the user's contacts. By doing so, the user's online social contacts are integrated with the offline service, and the user's online social relationship can be utilized to improve user experience at the offline service site. From 106, method 100 proceeds to 108.

At 108, the AR client terminal scans an offline service label at the offline service site. The offline service label can be an identification (such as a graphical identification) present at the offline service site used for triggering an offline-service multi-user interactive interface. For example, the offline service label can be a logo or a QR code. The offline service label can be the same as or different than the site label. From 108, method 100 proceeds to 110.

At 110, the AR client terminal transmits information of the scanned offline service label to the server terminal, and as will be discussed more in steps 112 and 114, the service terminal establishes a multi-user service group and triggers an offline-service multi-user interactive interface for the service group. The offline-service multi-user interactive interface is a service interface for performing offline service interactions among multiple users, enabling intercommunication and service data sharing among multiple users. The service interface is displayed by each user's AR client terminal. In some implementations, the service interface is triggered in step 104 after the server terminal receives the scanned site label, and in step 106 the AR client terminal displays the virtual data related to the site label in the service interface.

For example, after multiple users arrives at an offline service site, each user's AR client terminal scans the offline service label. Each AR client terminal can transmit information of the scanned offline service label to the server terminal. After recognizing the offline service label from the scanned image, the server terminal can establish a service group for the multiple users based on the recognized offline service label (for example, users scanning a same offline service label are assigned to a service group).

In the example of the offline restaurant, the offline service label can be a food-ordering label for triggering a multi-user food ordering interface. For instance, each table in the restaurant has a unique food-ordering label (one food-ordering label or multiple identical food-ordering labels), different tables having different food-ordering labels, and the users sitting at one table scan the same food-ordering label. The server terminal can establish a food-ordering group by grouping the users that scanned the same food-ordering label, and trigger a service interface for the users at the same table. The food-ordering interface is displayed in an AR scene through each user's AR client terminal, and the users in the group can jointly order food using the food-ordering interface. From 110, method 100 proceeds to 112.

At 112, each AR client terminal in the service group receives service data related to the service group from the server terminal. The service data can include data related to the service interface for the service group. As will be discussed more in step 114, the service data can be used by the AR client terminals in the service group to render the service interface. For example, the service data can indicate actions performed on the service interface by each user in the service group. In some implementations, the service data can also include information related to the offline service label, such as restaurant menus, food prices, and special offers. For example, the server terminal can maintain a database storing a large number of offline service labels and information data of each offline service label. The database for storing information of offline service labels can be the same as or different than the database storing information of site labels. The server terminal can determine if the offline service label scanned by the user's AR terminal matches any offline service label stored in the database. If a matched service label is found in the database, the server terminal can push the information data of the matched service label to the users in the service group. From 112, method 100 proceeds to 114.

At 114, based on the received service data from the server terminal, each AR client terminal in the service group displays the service interface to its respective user. The AR client terminal can display the service interface at a position corresponding to the offline service label in the AR scene. For example, after the AR terminal scans the offline service label on the restaurant table, the offline service label may not be in the view of the AR terminal anymore because the AR terminal is moved away from the offline service label. However, the AR terminal can display a virtual service label in the AR scene and display the service interface near or on top of the virtual service label. In some implementations, the AR terminal can display the service interface at a position of the site label in the AR scene.

Each user can perform actions on the service interface provided by the respective AR terminal. For example, when a particular user in the service group performs an action on the service interface displayed by the particular user's AR client terminal, the particular user's AR client terminal can update its service interface to reflect the action performed by the particular user. The particular user's AR client terminal also sends information of the action performed by the particular user to the server terminal. The server terminal can send service data indicating the action performed by the particular user to other users in the service group, so that the other users' AR client terminals can update their respective service interfaces to reflect the action performed by the particular user. Similarly, the particular user's AR terminal can receive service data indicating actions performed by the other users in the group, as well as corresponding user identifications, so that the particular user's AR terminal can update its service interface.

The service interface can display a number of objects, such as food items. Each user can select food items using the service interface displayed by the respective AR client terminal. Information of the food items selected by each user is uploaded to the server terminal. Based on the service data from the server terminal, each user's AR client terminal can update in real time the respective service interface to indicate the food items selected by the users in the service group. By doing so, the users on the same table can jointly order food and avoid duplicated food items.

For performing actions in the service interface provided by the AR terminal, the user can use various gestures, such as clicking, dragging, or swiping. For example, if the AR terminal is the user's mobile terminal, the service interface can be displayed on the mobile terminal's screen. The user can select objects in the service interface using selection gestures on the screen. In some cases, if the AR terminal is a wearable terminal such as AR glasses or helmet, a sensor can be connected to the AR terminal for sensing the user's gestures. The AR terminal can recognize the user's gesture, identify the action corresponding to the gesture, and update the service interface. The AR terminal can also send information of the action to the server terminal so that other users in the group can update their service interfaces.

Figure 3:
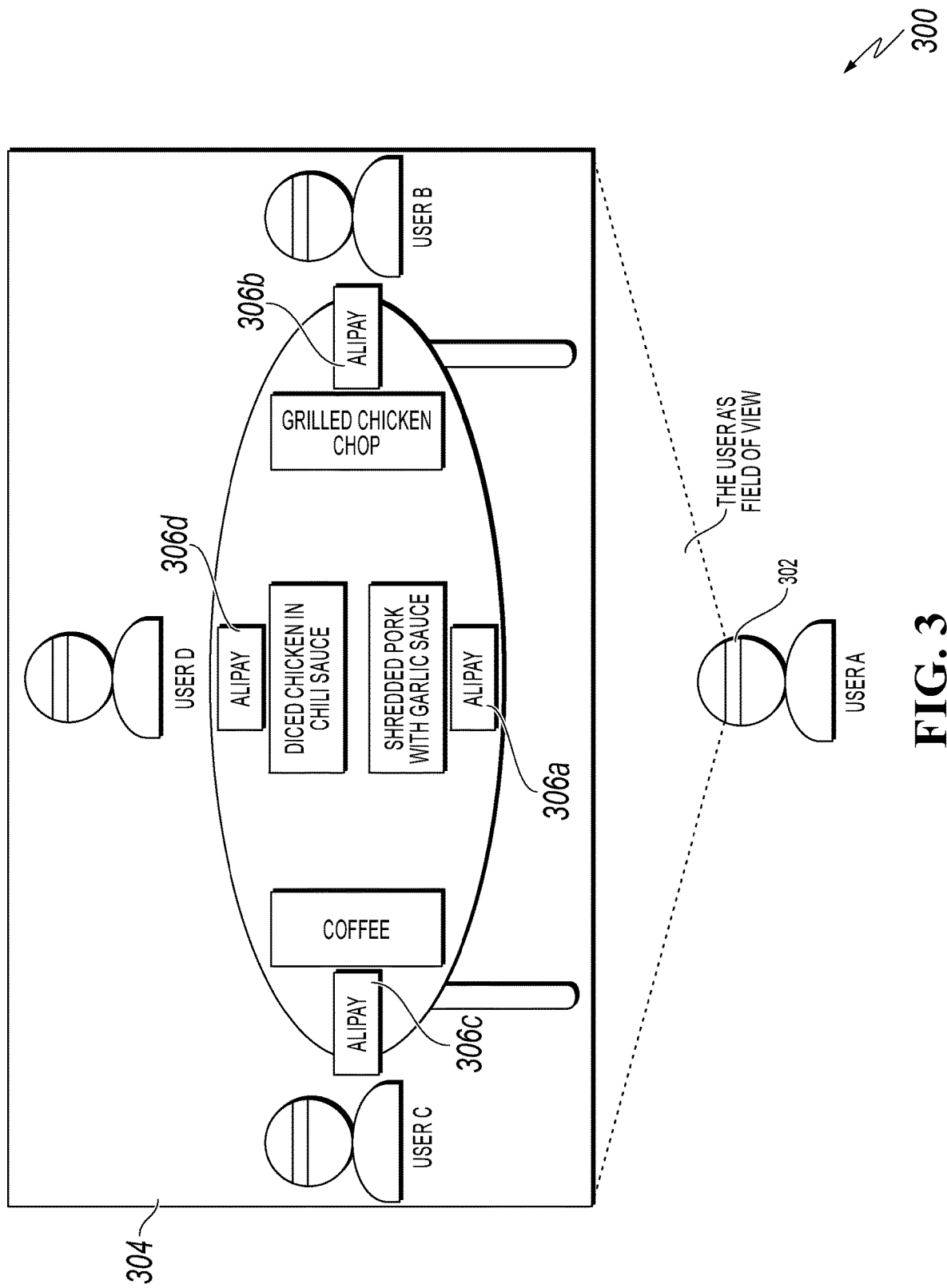
FIG. 3 is a schematic diagram illustrating an example of a service interface using multiple food-ordering labels, according to an implementation of the present disclosure.
Figure 4:
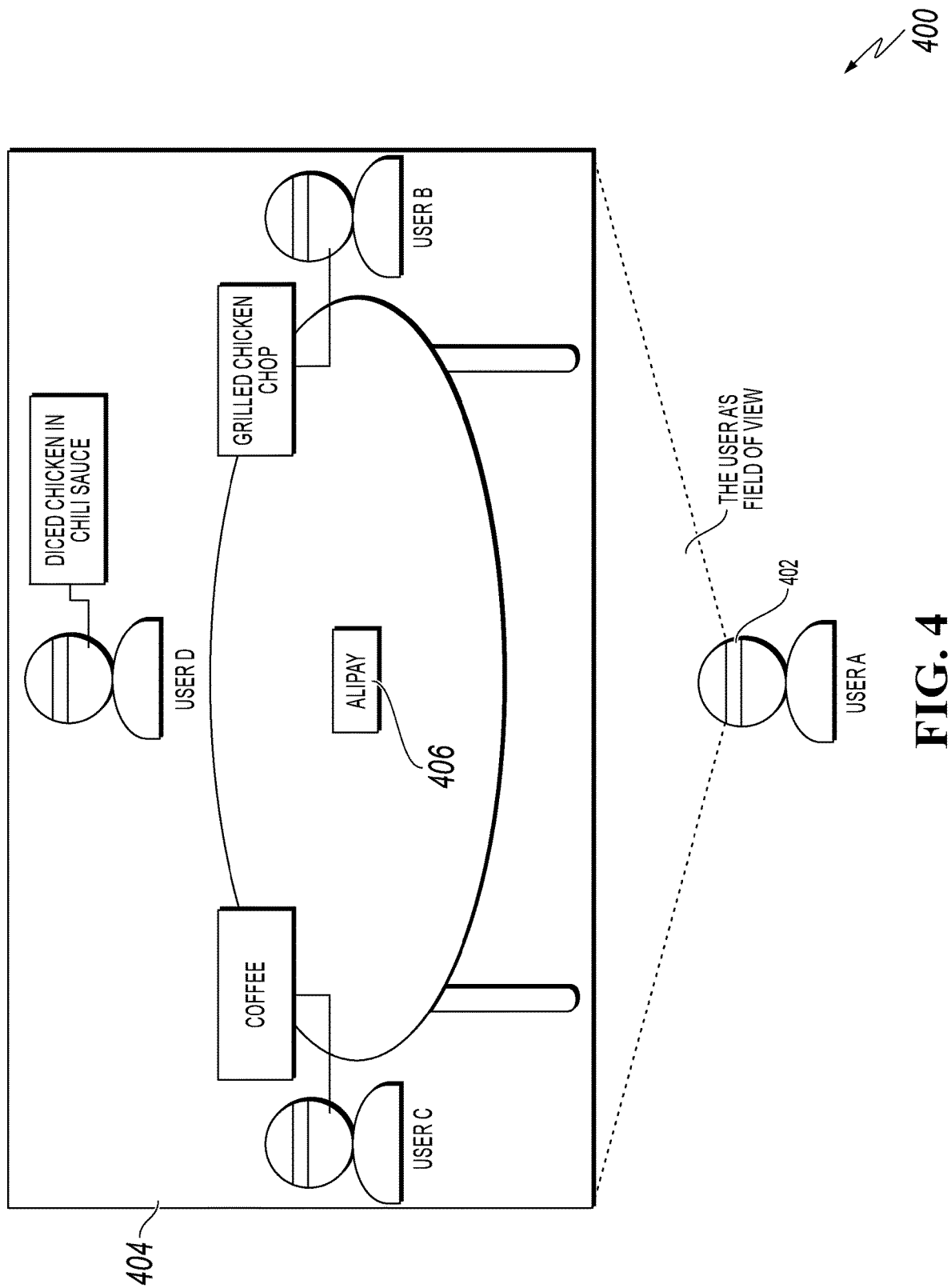
FIG. 4 is a schematic diagram illustrating an example of a service interface using a unique food-ordering label, according to an implementation of the present disclosure.

As discussed previously, the users in the same service group can scan a same offline service label to trigger the service interface (for example, each restaurant table has one food-ordering label or multiple identical food-ordering labels, as shown in FIG. 4). In some implementations, each table has different food-ordering labels corresponding to different seating positions of the table (as shown in FIG. 3). Each user can scan the food-ordering label corresponding to where the user sits. The server terminal can have prior knowledge that these different food-ordering labels are from the same table. Upon receiving these different food-ordering labels, the server terminal can group the corresponding users and enables a service interface for these users. By using different food-ordering labels for different seating positons, each user is associated with a seating position, and the service interface displayed by each AR client terminal can show different food-ordering labels at different seating positions.

For example, each user scans only the food-ordering labels in front of the user. After receiving the food-ordering labels from the users on the table, the service terminal can notify each user about other users in the group (such as other users' identifications) and corresponding seating positions so that each AR client terminal can display each user at the corresponding seating position in the service interface. The service interface can list the food items ordered by a user at the corresponding seating position of that user. In some implementations, each AR client terminal can scan the different food-ordering labels on the table so that the AR client terminal itself can associate the users with the seating positions.

In some implementations, each food-ordering label can include its own positioning information (for example, coordinate information of the food-ordering label). When each user scans the food-ordering label in front of the user, the user's AR client terminal can determine the position of the food-ordering label, and send the determined positioning information to the server terminal. In some implementations, instead of the AR client terminal determining the positioning information, the AR client terminal can send the scanned image of the food-ordering label to the server terminal, and the server terminal can determine the position of the food-ordering label. Each user can send the user identification information together with the positioning information to the server terminal. As a result, the server terminal has knowledge of each user's identification and the corresponding position, and share this knowledge to the users in the group, so that each AR client terminal can position different users at corresponding positions in the AR scene. When the server terminal push service data indicating food items selected by another user in the group, the service data can also include the other user's identification so that the AR client terminal can display the selected food items near or on top of the food-ordering label corresponding to that user.

In the cases that the users in the service group scan a same offline service label, using facial recognition and positioning techniques on the scanned image of the environmental scene, the AR client terminal can determine a position of each user's face (for example, coordinate information of the user's face in the AR scene). In some implementations, the server terminal has a mapping between facial images and user identifications. The AR client terminal can send the recognized facial images to the server terminal and receive the corresponding user identification information. In other words, for each user face, the AR client terminal knows the corresponding user identification and seating position. In some cases, the AR client terminal can send the scanned image of the environmental scene to the server terminal, and the server terminal can perform facial recognition and determine the position of each user's face and the corresponding user identification. When the server terminal push service data indicating food items selected by another user in the group, the service data can also include the other user's identification. Based on the relationship between user identifications and user faces, the AR client terminal can display the selected food items near the other user's face in the AR scene.

In some implementations, in addition to using the service interface to jointly order food, the user can also use the service interface to select an object (for example, a food item or a gift certificate) for a designated contact based on information of the user's social contacts. For example, the service interface can output a drop-down menu for selecting a contact. Information of contacts having a social relationship with the user may be pre-loaded in the drop-down menu. The user can designate a contact in the drop-down menu and select an object for the designated contact. The user's AR client terminal can upload information of the selected object, identification of the user, identification of the designated contact, and identification of the offline service site to the server terminal, and the server terminal can store the uploaded information. The server terminal can push a notification message to the designated contact indicating that the user has selected (or predetermined) an object for the designated contact at the offline service site. The notification message can be sent to the designated contact's AR client terminal (for example, a short message to the mobile terminal). In some cases, the predetermined object is associated with a valid time period. If the designated contact fails to arrive at the offline service site to use the object within the valid time period, the object becomes invalid automatically.

In some implementations, an AR client terminal may determine the position of a user in real time, and upload the position of the user to the server terminal in real time. After receiving the user position and based on the user's identification, the server terminal can determine if another user has predetermined an object for the user at an offline service site. If a distance between the offline service site and the user's location is less than a threshold (such as 100 m), the server terminal can push a notification message to the user indicating that another user has predetermined an object for the user at the offline service site.

For example, when user A dines in a restaurant, the restaurant may give user A a coupon, gift, or free food item as an appreciation token. For instance, user A can use the service interface to give away the coupon to a friend, user B. User A sends the user A's identification, user B's identification, the coupon information, and the restaurant identification to the server terminal. The server terminal can send a notification to user B indicating that user A gave a coupon to user B. Next time when user B is near the restaurant (for example, within a threshold distance), the server terminal can send a short message to user B's mobile terminal for notifying the coupon. Alternatively, user B's AR terminal can display an AR scene indicating the coupon as well as the coupon's expiration date. In some cases, user B's AR terminal can navigate user B to the restaurant. After 114, method 100 stops.

Figure 2:
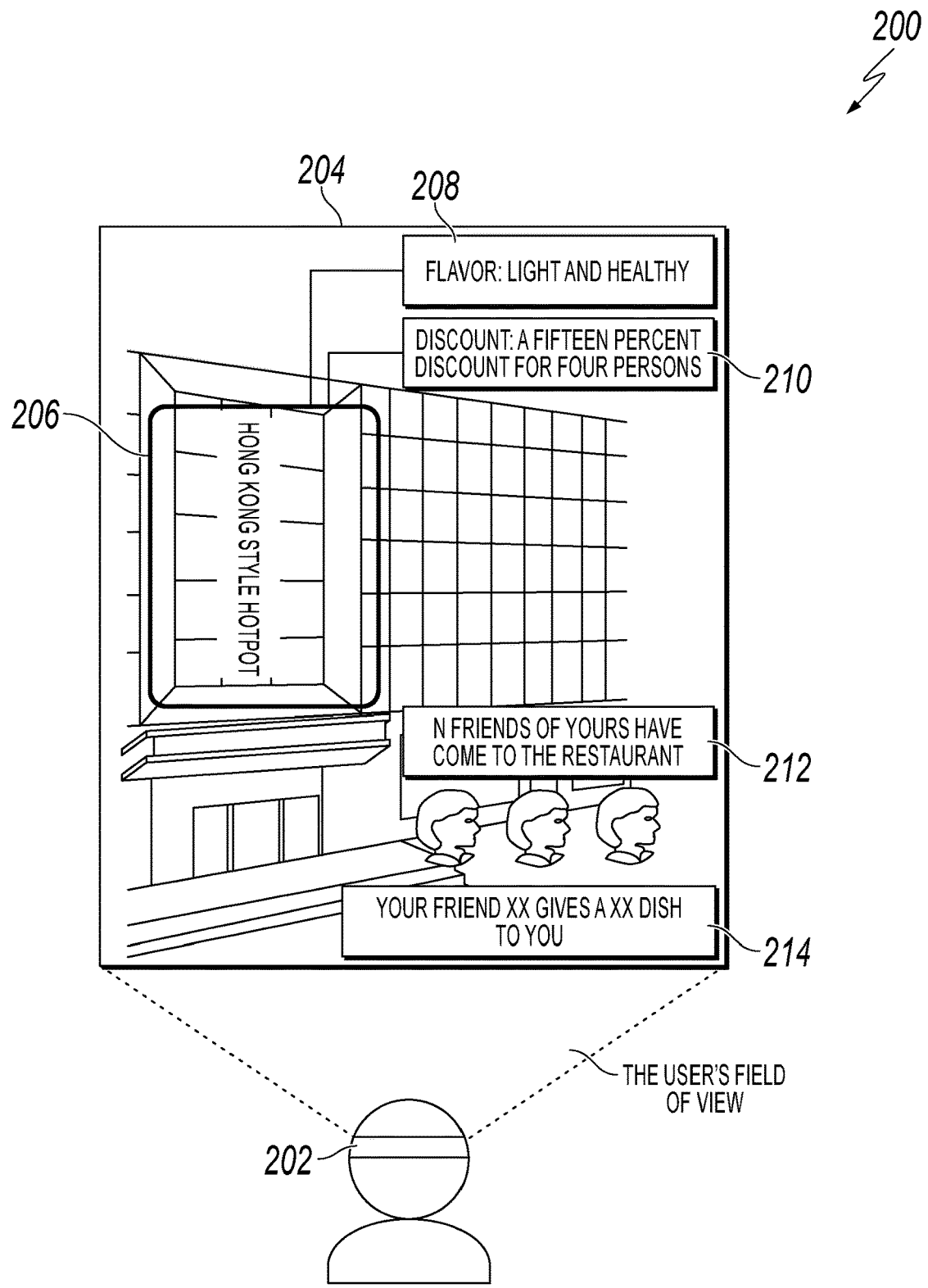
FIG. 2 is a schematic diagram illustrating an example of a service interface, according to an implementation of the present disclosure.

FIG. 2 is a schematic diagram illustrating an example 200 of a service interface, according to an implementation of the present disclosure. The example 200 shows that the user's AR terminal 202 displays an AR scene 204 to the user. After scanning a logo (site label) of an offline restaurant named "Hong Kong Style Hotpot," the user's AR terminal 202 can transmit information of the scanned image and the user's identification information (for example, a social account information used by the user to log into the AR terminal 202) to a server terminal in real time. After successfully recognizing the restaurant logo from the scanned image, the server terminal can push data associated with the restaurant logo to the AR terminal 202. As described in step 106, the pushed data can include label data of the restaurant, information of the user's contacts, and objects predetermined for the user by another user.

The AR terminal 202 displays a restaurant logo 206 in the AR scene 204. Based on the pushed data, the AR terminal 202 also displays a restaurant flavor label 208 "Flavor: Light and healthy" and a restaurant special offer label 210 "Discount: a fifteen percent discount for four persons". A text prompt 212 "N friends of yours have come to the restaurant" is displayed in the AR scene 204, as well as photos or icons of these friends from social applications. The AR terminal 202 also displays a text prompt 214 "Your friend XX gives a XX dish to you" to indicate a predetermined object from the user's friend.

FIG. 3 is a schematic diagram illustrating an example 300 of a service interface using multiple food-ordering labels, according to an implementation of the present disclosure. The example 300 shows that user A's AR terminal 302 displays an AR scene 304 to user A, where the AR scene 304 includes the food items users A-D have ordered. Multiple food-ordering labels 306a-d corresponding to seating positions of users A-D are present on a restaurant table. The AR terminal 302 displays the food-ordering labels 306a-d at respective positions in the AR scene 304. The AR terminal 302 displays food items selected by users A-D near the respective food-ordering labels 306a-d (user A selected "shredded pork with garlic sauce," user B selected "grilled chicken chop," user C selected "coffee," and user D selected "diced chicken in chili sauce").

FIG. 4 is a schematic diagram illustrating an example 400 of a service interface using a unique food-ordering label, according to an implementation of the present disclosure. The user case 400 shows that user A's AR terminal 402 displays an AR scene 404 to user A, where the AR scene 404 includes the food items users B-D have ordered. A unique food-ordering label 406 is present on a restaurant table. The AR terminal 402 displays faces of users B-D in the AR scene 404. The AR terminal 402 also displays food items selected by users B-D near the respective faces of users B-D.

Figure 5:
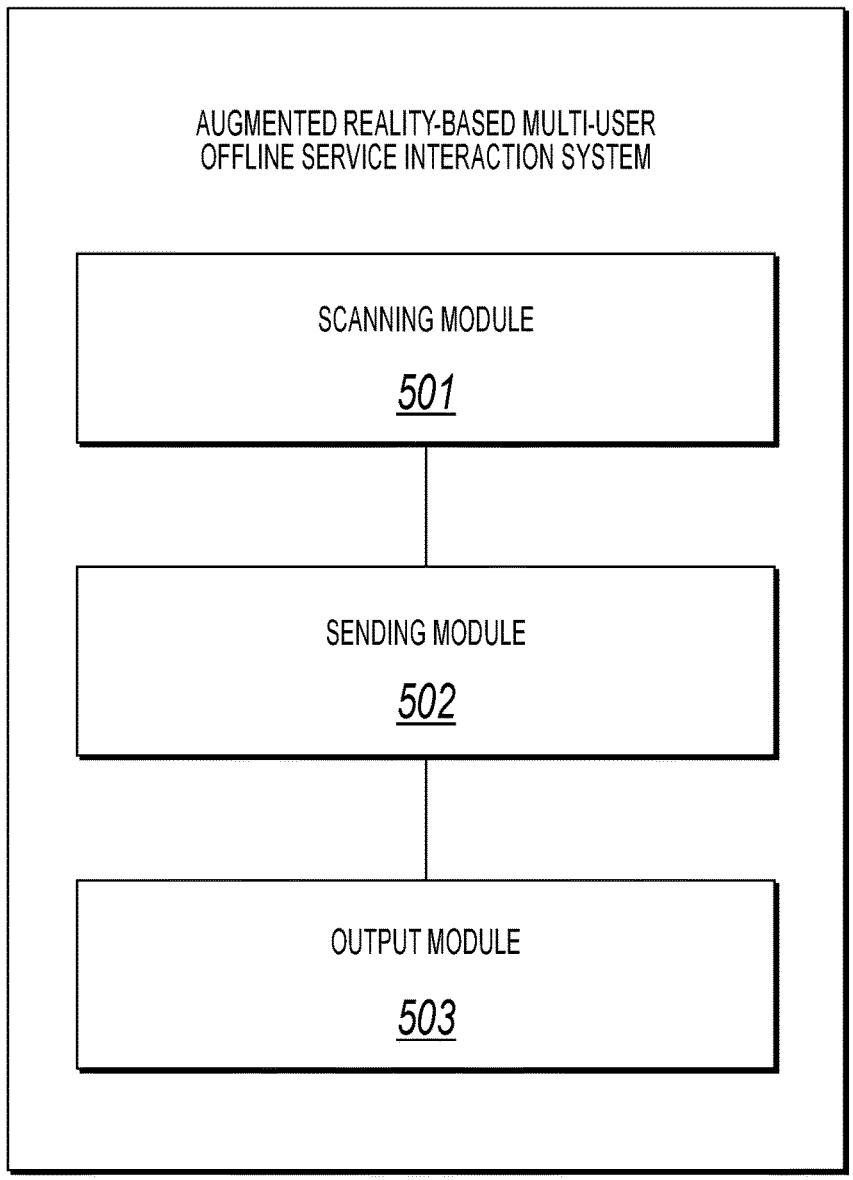
FIG. 5 is a block diagram illustrating an example of an AR-based offline-service multi-user interaction system, according to an implementation of the present disclosure.

FIG. 5 is a block diagram illustrating an example of an AR-based offline-service multi-user interaction system 500, according to an implementation of the present disclosure. The system 500 can be included in a user's AR client terminal. The system 500 can include a scanning module 501, a sending module 502, and an output module 503. The system 500 can be implemented in software, hardware, or a combination of software and hardware.

The scanning module 501 is configured to scan an offline service label present at an offline service site, where the offline service label is used for triggering an offline-service multi-user interactive interface. The sending module 502 is configured to send information of the scanned offline service label, as well as the user's identification information, to a server terminal, so that the server terminal establishes, based on the information of the offline service label, a service group including the user and another user that scanned the offline service label. The output module 503 is configured to receive service data pushed by the server terminal, and output, based on the service data, a service interface at a position corresponding to the offline service label in an AR scene.

In some implementations, the system 500 can also include an uploading module, a receiving module, and a display module (not shown in FIG. 5). The uploading module is configured to upload information of an object selected by the user to the server terminal when the user performs offline service interaction in the service interface. The receiving module is configured to receive information of an object that is selected by another user when the other user performs offline service interaction in the service interface and pushed by the server terminal. The display module is configured to synchronously display, in the AR scene, the objects selected by the user and the other user in the service interface.

In some implementations, the system 500 can also include an acquisition module (not shown in FIG. 5). The acquisition module is configured to acquire information of an object predetermined by the user for a designated contact in the service interface. The uploading module is further configured to upload the object predetermined by the user for the designated contact, identification information of the designated contact, and identification information of an offline service site corresponding to the predetermined object to the server terminal, so that the server terminal establishes an association relationship among the identification information of the designated contact, the object predetermined for the designated contact, and the identification information of the offline service site.

In some implementations, the uploading module is further configured to upload a position of the user to the server terminal in real time. The receiving module is further configured to receive a notification message pushed by the server terminal when another user predetermines an object for the user at an offline service site and the server terminal determines, based on the position of the user, that a distance between the user and the offline service site is less than a preset threshold. The notification message is used for prompting that another user has predetermined an object for the user in the offline service site.

In some implementations, the scanning module 501 is further configured to scan a site label present at the offline service site. The sending module 502 is further configured to send information of the scanned site label to the server terminal, so that the server terminal queries for label data corresponding to the site label. The receiving module is further configured to receive the label data corresponding to the site label pushed by the server terminal. The display module is further configured to display the label data at a position corresponding to the site label in the AR scene.

In some implementations, the server terminal searches, based on the identification information of the user, a visitor database of the offline service site for information of contacts associated with the user. The receiving module is further configured to receive the information of contacts associated with the user pushed by the server terminal. The display module is further configured to display the information of contacts associated with the user at the position corresponding to the site label in the AR scene.

In some implementations, the server terminal queries for, based on the identification information of the user, an object predetermined by another user for the user. The receiving module is further configured to receive the object that is predetermined by the other user for the user and pushed by the server terminal. The display module is further configured to display the object predetermined by the other user for the user at the position corresponding to the site label in the AR scene.

In some implementations, multiple offline service labels are used to trigger the service interface. The display module is configured to position offline service labels the user and the other user scanned in the AR scene. The display module is configured to synchronously display, at positions of the offline service labels corresponding to the user and the other user, the objects selected by the user and the other user in the service interface.

In some implementations, the display module is configured to position faces of the user and the other user in the AR scene. The display module is configured to synchronously display, at positions corresponding to the faces of the user and the other user in the AR scene, the objects selected by the user and the other user in the service interface.

Figure 6:
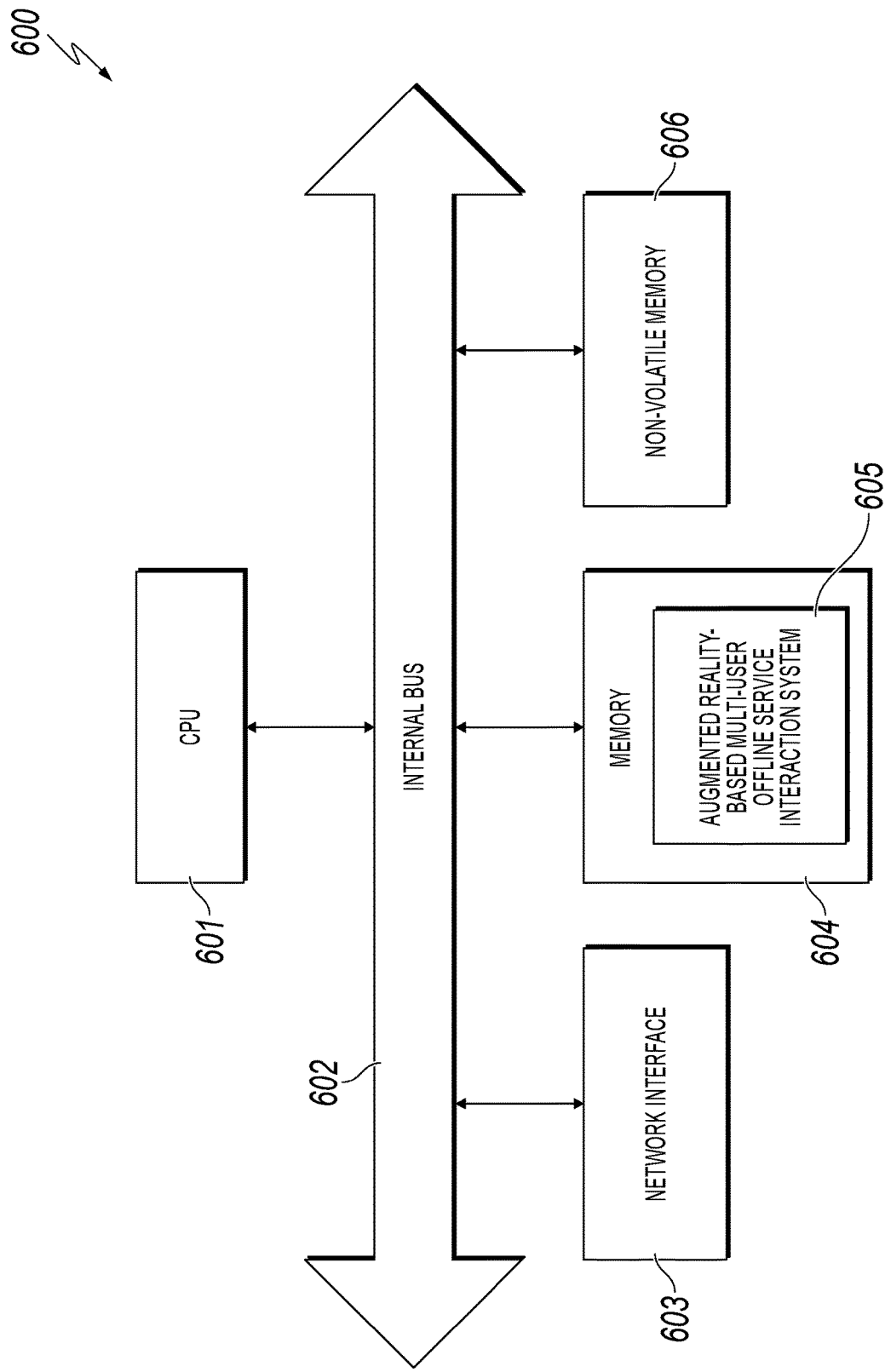
FIG. 6 is a block diagram illustrating an example of a hardware architecture including an AR-based offline-service multi-user interaction system, according to an implementation of the present disclosure.

FIG. 6 is a block diagram illustrating an example of a hardware architecture 600 including an AR-based offline-service multi-user interaction system, according to an implementation of the present disclosure. The hardware architecture 600 can include the AR-based offline-service multi-user interaction system 500 in FIG. 5. The hardware architecture 600 can include a CPU 601, a network interface 603, a memory 604, and a non-volatile storage device 606. The hardware architecture 600 also includes an internal bus 602 connecting the CPU 601, the network interface 603, the memory 604, and the non-volatile storage device 606. The memory 604 can include an AR-based offline-service multi-user interaction system 605. The AR-based offline-service multi-user interaction system 605 can be the AR-based offline-service multi-user interaction system 500 if the AR-based offline-service multi-user interaction system 500 is implemented in software, and the CPU 601 can execute codes of the AR-based offline-service multi-user interaction system 605 loaded in the memory 604.

Figure 7:
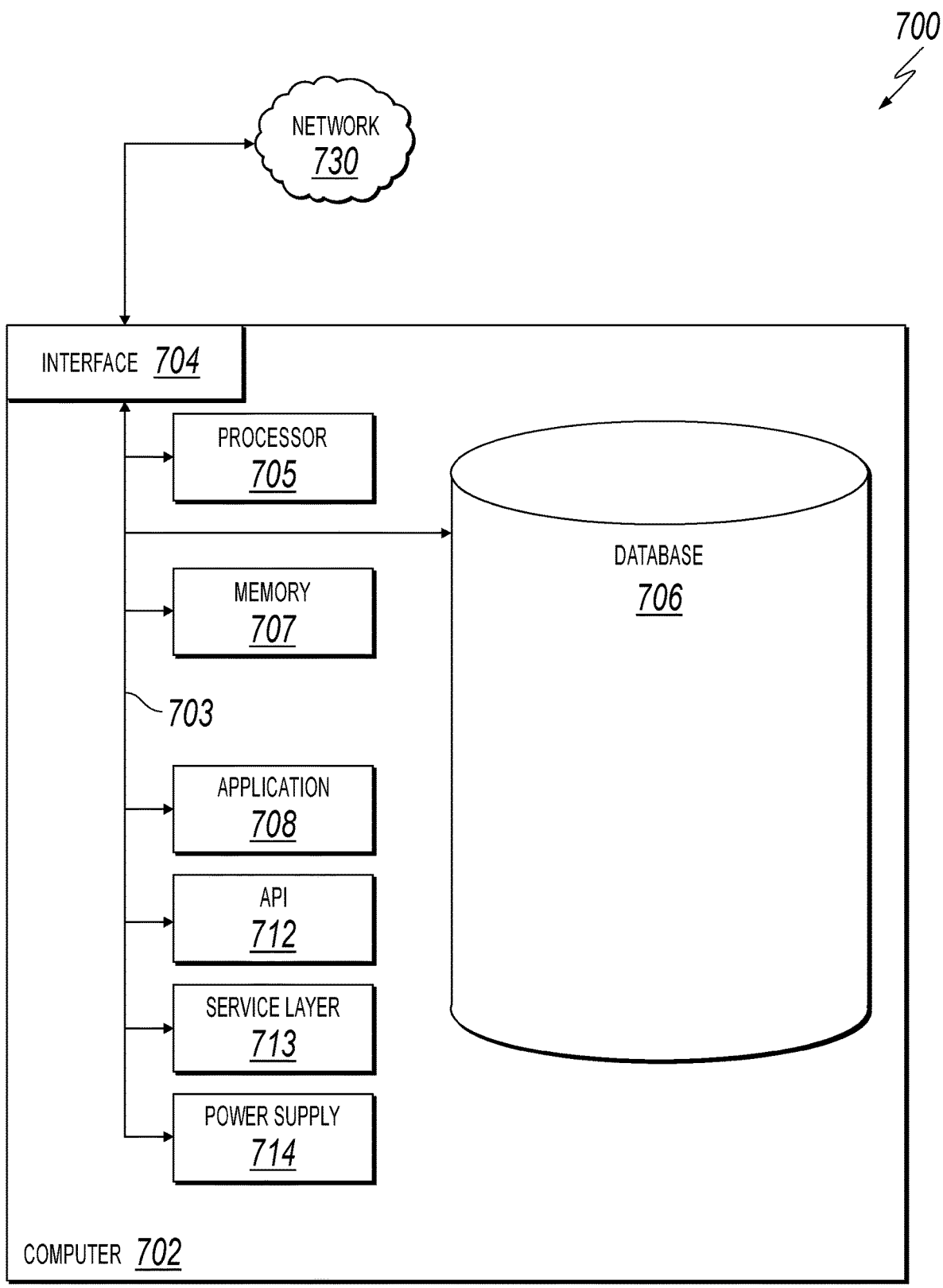
FIG. 7 is a block diagram illustrating an example of a computer-implemented system used to provide computational functionalities associated with described algorithms, methods, functions, processes, flows, and procedures, according to an implementation of the present disclosure.

FIG. 7 is a block diagram illustrating an example of a computer-implemented system 700 used to provide computational functionalities associated with described algorithms, methods, functions, processes, flows, and procedures, according to an implementation of the present disclosure. In the illustrated implementation, system 700 includes a computer 702 and a network 730.

The illustrated computer 702 is intended to encompass any computing device such as a server, desktop computer, laptop/notebook computer, wireless data port, smart phone, personal data assistant (PDA), tablet computing device, one or more processors within these devices, another computing device, or a combination of computing devices, including physical or virtual instances of the computing device, or a combination of physical or virtual instances of the computing device. Additionally, the computer 702 can include an input device, such as a keypad, keyboard, touch screen, another input device, or a combination of input devices that can accept user information, and an output device that conveys information associated with the operation of the computer 702, including digital data, visual, audio, another type of information, or a combination of types of information, on a graphical-type user interface (UI) (or GUI) or other UI.

The computer 702 can serve in a role in a distributed computing system as a client, network component, a server, a database or another persistency, another role, or a combination of roles for performing the subject matter described in the present disclosure. The illustrated computer 702 is communicably coupled with a network 730. In some implementations, one or more components of the computer 702 can be configured to operate within an environment, including cloud-computing-based, local, global, another environment, or a combination of environments.

At a high level, the computer 702 is an electronic computing device operable to receive, transmit, process, store, or manage data and information associated with the described subject matter. According to some implementations, the computer 702 can also include or be communicably coupled with a server, including an application server, e-mail server, web server, caching server, streaming data server, another server, or a combination of servers.

The computer 702 can receive requests over network 730 (for example, from a client software application executing on another computer 702) and respond to the received requests by processing the received requests using a software application or a combination of software applications. In addition, requests can also be sent to the computer 702 from internal users (for example, from a command console or by another internal access method), external or third-parties, or other entities, individuals, systems, or computers.

Each of the components of the computer 702 can communicate using a system bus 703. In some implementations, any or all of the components of the computer 702, including hardware, software, or a combination of hardware and software, can interface over the system bus 703 using an application programming interface (API) 712, a service layer 713, or a combination of the API 712 and service layer 713. The API 712 can include specifications for routines, data structures, and object classes. The API 712 can be either computer-language independent or dependent and refer to a complete interface, a single function, or even a set of APIs. The service layer 713 provides software services to the computer 702 or other components (whether illustrated or not) that are communicably coupled to the computer 702. The functionality of the computer 702 can be accessible for all service consumers using this service layer. Software services, such as those provided by the service layer 713, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the computer 702, alternative implementations can illustrate the API 712 or the service layer 713 as stand-alone components in relation to other components of the computer 702 or other components (whether illustrated or not) that are communicably coupled to the computer 702. Moreover, any or all parts of the API 712 or the service layer 713 can be implemented as a child or a sub-module of another software module, enterprise application, or hardware module without departing from the scope of the present disclosure.

The computer 702 includes an interface 704. Although illustrated as a single interface 704 in FIG. 7, two or more interfaces 704 can be used according to particular needs, desires, or particular implementations of the computer 702. The interface 704 is used by the computer 702 for communicating with another computing system (whether illustrated or not) that is communicatively linked to the network 730 in a distributed environment. Generally, the interface 704 is operable to communicate with the network 730 and includes logic encoded in software, hardware, or a combination of software and hardware. More specifically, the interface 704 can include software supporting one or more communication protocols associated with communications such that the network 730 or interface's hardware is operable to communicate physical signals within and outside of the illustrated computer 702.

The computer 702 includes a processor 705. Although illustrated as a single processor 705 in FIG. 7, two or more processors can be used according to particular needs, desires, or particular implementations of the computer 702. Generally, the processor 705 executes instructions and manipulates data to perform the operations of the computer 702 and any algorithms, methods, functions, processes, flows, and procedures as described in the present disclosure.

The computer 702 also includes a database 706 that can hold data for the computer 702, another component communicatively linked to the network 730 (whether illustrated or not), or a combination of the computer 702 and another component. For example, database 706 can be an in-memory, conventional, or another type of database storing data consistent with the present disclosure. In some implementations, database 706 can be a combination of two or more different database types (for example, a hybrid in-memory and conventional database) according to particular needs, desires, or particular implementations of the computer 702 and the described functionality. Although illustrated as a single database 706 in FIG. 7, two or more databases of similar or differing types can be used according to particular needs, desires, or particular implementations of the computer 702 and the described functionality. While database 706 is illustrated as an integral component of the computer 702, in alternative implementations, database 706 can be external to the computer 702.

The computer 702 also includes a memory 707 that can hold data for the computer 702, another component or components communicatively linked to the network 730 (whether illustrated or not), or a combination of the computer 702 and another component. Memory 707 can store any data consistent with the present disclosure. In some implementations, memory 707 can be a combination of two or more different types of memory (for example, a combination of semiconductor and magnetic storage) according to particular needs, desires, or particular implementations of the computer 702 and the described functionality. Although illustrated as a single memory 707 in FIG. 7, two or more memories 707 or similar or differing types can be used according to particular needs, desires, or particular implementations of the computer 702 and the described functionality. While memory 707 is illustrated as an integral component of the computer 702, in alternative implementations, memory 707 can be external to the computer 702.

The application 708 is an algorithmic software engine providing functionality according to particular needs, desires, or particular implementations of the computer 702, particularly with respect to functionality described in the present disclosure. For example, application 708 can serve as one or more components, modules, or applications. Further, although illustrated as a single application 708, the application 708 can be implemented as multiple applications 708 on the computer 702. In addition, although illustrated as integral to the computer 702, in alternative implementations, the application 708 can be external to the computer 702.

The computer 702 can also include a power supply 714. The power supply 714 can include a rechargeable or non-rechargeable battery that can be configured to be either user- or non-user-replaceable. In some implementations, the power supply 714 can include power-conversion or management circuits (including recharging, standby, or another power management functionality). In some implementations, the power-supply 714 can include a power plug to allow the computer 702 to be plugged into a wall socket or another power source to, for example, power the computer 702 or recharge a rechargeable battery.

There can be any number of computers 702 associated with, or external to, a computer system containing computer 702, each computer 702 communicating over network 730. Further, the term "client," "user," or other appropriate terminology can be used interchangeably, as appropriate, without departing from the scope of the present disclosure. Moreover, the present disclosure contemplates that many users can use one computer 702, or that one user can use multiple computers 702.

Described implementations of the subject matter can include one or more features, alone or in combination.

For example, in a first implementation, a computer-implemented method, comprising: scanning, by an AR client terminal of a user, an offline service label at an offline service site; transmitting information of the offline service label to a server terminal, wherein the server terminal establishes, based on the information of the offline service label, a service group including the user and a second user that scanned the offline service label; in response to transmitting the information of the offline service label, receiving service data from the server terminal, the service data including information related to the user and information related to the second user; and based on the service data, outputting a service interactive interface, the service interactive interface displaying the information related to the user and the information related to the second user at a position corresponding to the offline service label in an AR scene.

The foregoing and other described implementations can each, optionally, include one or more of the following features:

A first feature, combinable with any of the following features, further comprising: sending, to the server terminal, information of a first object selected by the user using the service interactive interface; receiving, from the server terminal, information of a second object selected by the second user using the service interactive interface; and displaying, in the AR scene, the information of the first object and the information of the second object in the service interactive interface.

A second feature, combinable with any of the previous or following features, further comprising: selecting a third object for a designated social contact of the user using the service interactive interface; and uploading, to the server terminal, information of the third object, identification information of the designated social contact, and identification information of the offline service site.

A third feature, combinable with any of the previous or following features, further comprising: uploading a position of the user to the server terminal in real time; and receiving, from the server terminal, a notification message when a third user selects a fourth object for the user in a second offline service site and a distance between the position of the user and a position of the second offline service site is less than a predefined threshold, the notification message indicating that the third user has selected the fourth object for the user in the second offline service site.

A fourth feature, combinable with any of the previous or following features, further comprising: scanning, by the AR client terminal, a site label at the offline service site; transmitting information of the site label to the server terminal; in response to transmitting the information of the site label, receiving, from the server terminal, label data of the offline service site, the label data including information related to the offline service site; and displaying the information related to the offline service site at a position corresponding to the site label in the AR scene.

A fifth feature, combinable with any of the previous or following features, further comprising: in response to transmitting the information of the site label, receiving, from the server terminal, information of social contacts of the user; and displaying the information of social contacts at a position corresponding to the site label in the AR scene.

A sixth feature, combinable with any of the previous or following features, further comprising: in response to transmitting the information of the site label, receiving, from the server terminal, information of a fifth object selected by a fourth user for the user; and displaying the information of the fifth object at a position corresponding to the site label in the AR scene.

In a second implementation, a non-transitory, computer-readable medium storing one or more instructions executable by a computer system to perform operations comprising: scanning, by an AR client terminal of a user, an offline service label at an offline service site; transmitting information of the offline service label to a server terminal, wherein the server terminal establishes, based on the information of the offline service label, a service group including the user and a second user that scanned the offline service label; in response to transmitting the information of the offline service label, receiving service data from the server terminal, the service data including information related to the user and information related to the second user; and based on the service data, outputting a service interactive interface, the service interactive interface displaying the information related to the user and the information related to the second user at a position corresponding to the offline service label in an AR scene.

The foregoing and other described implementations can each, optionally, include one or more of the following features:

A first feature, combinable with any of the following features, wherein the operations further comprise: sending, to the server terminal, information of a first object selected by the user using the service interactive interface; receiving, from the server terminal, information of a second object selected by the second user using the service interactive interface; and displaying, in the AR scene, the information of the first object and the information of the second object in the service interactive interface.

A second feature, combinable with any of the previous or following features, wherein the operations further comprise: selecting a third object for a designated social contact of the user using the service interactive interface; and uploading, to the server terminal, information of the third object, identification information of the designated social contact, and identification information of the offline service site.

A third feature, combinable with any of the previous or following features, wherein the operations further comprise: uploading a position of the user to the server terminal in real time; and receiving, from the server terminal, a notification message when a third user selects a fourth object for the user in a second offline service site and a distance between the position of the user and a position of the second offline service site is less than a predefined threshold, the notification message indicating that the third user has selected the fourth object for the user in the second offline service site.

A fourth feature, combinable with any of the previous or following features, wherein the operations further comprise: scanning, by the AR client terminal, a site label at the offline service site; transmitting information of the site label to the server terminal; in response to transmitting the information of the site label, receiving, from the server terminal, label data of the offline service site, the label data including information related to the offline service site; and displaying the information related to the offline service site at a position corresponding to the site label in the AR scene.

A fifth feature, combinable with any of the previous or following features, wherein the operations further comprise: in response to transmitting the information of the site label, receiving, from the server terminal, information of social contacts of the user; and displaying the information of social contacts at a position corresponding to the site label in the AR scene.

A sixth feature, combinable with any of the previous or following features, wherein the operations further comprise: in response to transmitting the information of the site label, receiving, from the server terminal, information of a fifth object selected by a fourth user for the user; and displaying the information of the fifth object at a position corresponding to the site label in the AR scene.

In a third implementation, a computer-implemented system, comprising: one or more computers; and one or more computer memory devices interoperably coupled with the one or more computers and having tangible, non-transitory, machine-readable media storing one or more instructions that, when executed by the one or more computers, perform one or more operations comprising: scanning, by an AR client terminal of a user, an offline service label at an offline service site; transmitting information of the offline service label to a server terminal, wherein the server terminal establishes, based on the information of the offline service label, a service group including the user and a second user that scanned the offline service label; in response to transmitting the information of the offline service label, receiving service data from the server terminal, the service data including information related to the user and information related to the second user; and based on the service data, outputting a service interactive interface, the service interactive interface displaying the information related to the user and the information related to the second user at a position corresponding to the offline service label in an AR scene.

The foregoing and other described implementations can each, optionally, include one or more of the following features:

A first feature, combinable with any of the following features, wherein the one or more operations further comprise: sending, to the server terminal, information of a first object selected by the user using the service interactive interface; receiving, from the server terminal, information of a second object selected by the second user using the service interactive interface; and displaying, in the AR scene, the information of the first object and the information of the second object in the service interactive interface.

A second feature, combinable with any of the previous or following features, wherein the one or more operations further comprise: selecting a third object for a designated social contact of the user using the service interactive interface; and uploading, to the server terminal, information of the third object, identification information of the designated social contact, and identification information of the offline service site.

A third feature, combinable with any of the previous or following features, wherein the one or more operations further comprise: uploading a position of the user to the server terminal in real time; and receiving, from the server terminal, a notification message when a third user selects a fourth object for the user in a second offline service site and a distance between the position of the user and a position of the second offline service site is less than a predefined threshold, the notification message indicating that the third user has selected the fourth object for the user in the second offline service site.

A fourth feature, combinable with any of the previous or following features, wherein the one or more operations further comprise: scanning, by the AR client terminal, a site label at the offline service site; transmitting information of the site label to the server terminal; in response to transmitting the information of the site label, receiving, from the server terminal, label data of the offline service site, the label data including information related to the offline service site; and displaying the information related to the offline service site at a position corresponding to the site label in the AR scene.

A fifth feature, combinable with any of the previous or following features, wherein the one or more operations further comprise: in response to transmitting the information of the site label, receiving, from the server terminal, information of social contacts of the user; and displaying the information of social contacts at a position corresponding to the site label in the AR scene.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to a receiver apparatus for execution by a data processing apparatus. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and apparatus can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital video disc (DVD), CD-ROM, DVD+/−R, DVD-RAM, DVD-ROM, HD-DVD, and BLURAY, and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what can be claimed, but rather as descriptions of features that can be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method;

a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
receiving, by a server terminal from an augmented reality (AR) client terminal, information associated with an offline service label scanned by the AR terminal;
establishing, by the server terminal, a service group including a first user and a second user that both scanned the offline service label;
transmitting, from the server terminal, service data that includes information related to the first user and information related to the second user;
causing, by the server terminal, based upon the service data, a display of a first service interactive interface to the first user and a display of a second service interactive interface to the second user, each of the first service interactive interface and the second service interactive interface displaying, at a position corresponding to the offline service label in an AR scene, the information related to the first user and the information related to the second user;
receiving, at the server terminal while the first interactive service interface and the second service interactive interface are both displayed, first selection data associated with one or more selections made by the first user from the first service interactive interface and second selection data associated with one or more selections made by the second user from the second service interactive interface;
causing a display of the first selection data associated with the one or more selections made by the first user from the first service interactive interface; and
causing a display of the second selection data associated with the one or more selections made by the second user from the second service interactive interface.

2. The computer-implemented method of claim 1, further comprising:
transmitting, from the server terminal, to the second service interactive interface, the first selection data associated with the one or more selections made by the first user; and
causing a display, in the AR scene, at the second service interactive interface, of the second selection data associated with the one or more selection made by the second user.

3. The computer-implemented method of claim 1, further comprising:
receiving, at the server terminal, information of a first object selected by the first user using the first service interactive interface;
transmitting, by the server terminal, information of a second object selected by the second user using the second service interactive interface; and
causing a display, in the AR scene, of the information of the first object in the second service interactive interface and the information of the second object in the first service interactive interface.

4. The computer-implemented method of claim 1, further comprising:
receiving, at the server terminal, information for an object selected for a designated social contact of the first user using the first service interactive interface, identification information of the designated social contact, and identification information of an offline service site.

5. The computer-implemented method of claim 1, further comprising:
receiving, at the server terminal, information of a site label scanned at an offline service site by the AR client terminal;
in response to receiving the information of the site label, transmitting, from the server terminal, label data of the offline service site, the label data including information related to the offline service site; and
causing a display of the information related to the offline service site at a position corresponding to the site label in the AR scene.

6. The computer-implemented method of claim 5, further comprising:
in response to receiving the information of the site label, transmitting, from the server terminal, information of social contacts of the first user; and
causing the display of the information of social contacts at a position corresponding to the site label in the AR scene.

7. The computer-implemented method of claim 5, further comprising:
in response to receiving the information of the site label, transmitting, from the server terminal, information of an object selected by a third user for the first user; and
causing the display of the information of the object at a position corresponding to the site label in the AR scene.

8. A non-transitory, computer-readable medium storing one or more instructions executable by a computer system to perform operations comprising:
receiving, by a server terminal from an augmented reality (AR) client terminal, information associated with an offline service label scanned by the AR terminal;
establishing, by the server terminal, a service group including a first user and a second user that both scanned the offline service label;
transmitting, from the server terminal, service data that includes information related to the first user and information related to the second user;
causing, by the server terminal, based upon the service data, a display of a first service interactive interface to the first user and a display of a second service interactive interface to the second user, each of the first service interactive interface and the second service interactive interface displaying, at a position corresponding to the offline service label in an AR scene, the information related to the first user and the information related to the second user;
receiving, at the server terminal while the first interactive service interface and the second service interactive interface are both displayed, first selection data associated with one or more selections made by the first user from the first service interactive interface and second selection data associated with one or more selections made by the second user from the second service interactive interface;
causing a display of the first selection data associated with the one or more selections made by the first user from the first service interactive interface; and
causing a display of the second selection data associated with the one or more selections made by the second user from the second service interactive interface.

9. The non-transitory, computer-readable medium of claim 8, wherein the operations further comprise:

transmitting, from the server terminal, to the second service interactive interface, the first selection data associated with the one or more selections made by the first user; and causing a display, in the AR scene, the second service interactive interface, of the second selection data associated with the one or more selections made by the second user.

10. The non-transitory, computer-readable medium of claim 8, wherein the operations further comprise:

receiving, at the server terminal, information of a first object selected by the first user using the first service interactive interface;

transmitting, by the server terminal, information of a second object selected by the second user using the second service interactive interface; and causing a display, in the AR scene, of the information of the first object in the second service interactive interface and the information of the second object in the first service interactive interface.

11. The non-transitory, computer-readable medium of claim 8, wherein the operations further comprise:

receiving, at the server terminal, information for an object selected for a designated social contact of the first user using the first service interactive interface, identification information of the designated social contact, and identification information of an offline service site.

12. The non-transitory, computer-readable medium of claim 8, wherein the operations further comprise:

receiving, at the server terminal, information of a site label scanned at an offline service site by the AR client terminal;

in response to receiving the information of the site label, transmitting, from the server terminal, label data of the offline service site, the label data including information related to the offline service site; and causing a display of the information related to the offline service site at a position corresponding to the site label in the AR scene.

13. The non-transitory, computer-readable medium of claim 12, wherein the operations further comprise:

in response to receiving the information of the site label, transmitting, from the server terminal, information of social contacts of the first user; and causing the display of the information of social contacts at a position corresponding to the site label in the AR scene.

14. The non-transitory, computer-readable medium of claim 12, wherein the operations further comprise:

in response to receiving the information of the site label, transmitting, from the server terminal, information of an object selected by a third user for the first user; and causing the display of the information of the object at a position corresponding to the site label in the AR scene.

15. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

receiving, by a server terminal from an augmented reality (AR) client terminal, information associated with an offline service label scanned by the AR terminal;

establishing, by the server terminal, a service group including a first user and a second user that both scanned the offline service label;

transmitting, from the server terminal, service data that includes information related to the first user and information related to the second user;

causing, by the server terminal, based upon the service data, a display of a first service interactive interface to the first user and a display of a second service interactive interface to the second user, each of the first service interactive interface and the second service interactive interface displaying, at a position corresponding to the offline service label in an AR scene, the information related to the first user and the information related to the second user;

receiving, at the server terminal while the first interactive service interface and the second service interactive interface are both displayed, first selection data associated with one or more selections made by the first user from the first service interactive interface and second selection data associated with one or more selections made by the second user from the second service interactive interface;

causing a display of the first selection data associated with the one or more selections made by the first user from the first service interactive interface; and causing a display of the second selection data associated with the one or more selections made by the second user from the second service interactive interface.

16. The computer-implemented system of claim 15, wherein the one or more operations further comprise:

transmitting, from the server terminal, to the second service interactive interface, the first selection data associated with the one or more selections made by the first user; and causing a display, in the AR scene, at the second service interactive interface, of the second selection data associated with the one or more selections made by the second user.

17. The computer-implemented system of claim 15, wherein the one or more operations further comprise:

receiving, at the server terminal, information of a first object selected by the first user using the first service interactive interface;

transmitting, by the server terminal, information of a second object selected by the second user using the second service interactive interface; and causing a display, in the AR scene, of the information of the first object in the second service interactive interface and the information of the second object in the first service interactive interface.

18. The computer-implemented system of claim 17, wherein the one or more operations further comprise:

receiving, at the server terminal, information for an object selected for a designated social contact of the first user using the first service interactive interface, identification information of the designated social contact, and identification information of an offline service site.

19. The computer-implemented system of claim 18, wherein the one or more operations further comprise:

receiving, at the server terminal, information of a site label scanned at an offline service site by the AR client terminal;

in response to receiving the information of the site label, transmitting, from the server terminal, label data of the offline service site, the label data including information related to the offline service site; and causing a display of the information related to the offline service site at a position corresponding to the site label in the AR scene.

20. The computer-implemented system of claim 19, wherein the one or more operations further comprise:

in response to receiving the information of the site label, transmitting, from the server terminal, information of social contacts of the first user; and causing the display of the information of social contacts at a position corresponding to the site label in the AR scene.

\* \* \* \* \*

UNITED STATES PATENT AND TRADEMARK OFFICE
CERTIFICATE OF CORRECTION

PATENT NO. : 10,789,475 B2  
APPLICATION NO. : 16/422798  
DATED : September 29, 2020  
INVENTOR(S) : Huanmi Yin et al.

Page 1 of 1

It is certified that error appears in the above-identified patent and that said Letters Patent is hereby corrected as shown below:

On the Title Page

Item (56) Other Publications, Column 2, Line 2, delete "Technica" and insert -- Technical --, therefor.

In the Claims

In Claim 2, Column 23, Line 50, delete "selection" and insert -- selections --, therefor.

In Claim 9, Column 25, Line 5, after "scene," insert -- at --.

In Claim 18, Column 26, Line 54, delete "claim 17," and insert -- claim 15, --, therefor.

In Claim 19, Column 26, Line 61, delete "claim 18," and insert -- claim 15, --, therefor.

Signed and Sealed this  
Second Day of February, 2021

Drew Hirshfeld  
*Performing the Functions and Duties of the*  
*Under Secretary of Commerce for Intellectual Property and*  
*Director of the United States Patent and Trademark Office*